April 24, 1928. 1,667,382
H. A. HUNTOON
LOAD LIFTING AND TRANSPORTING DEVICE
Filed June 21, 1926 2 Sheets-Sheet 1
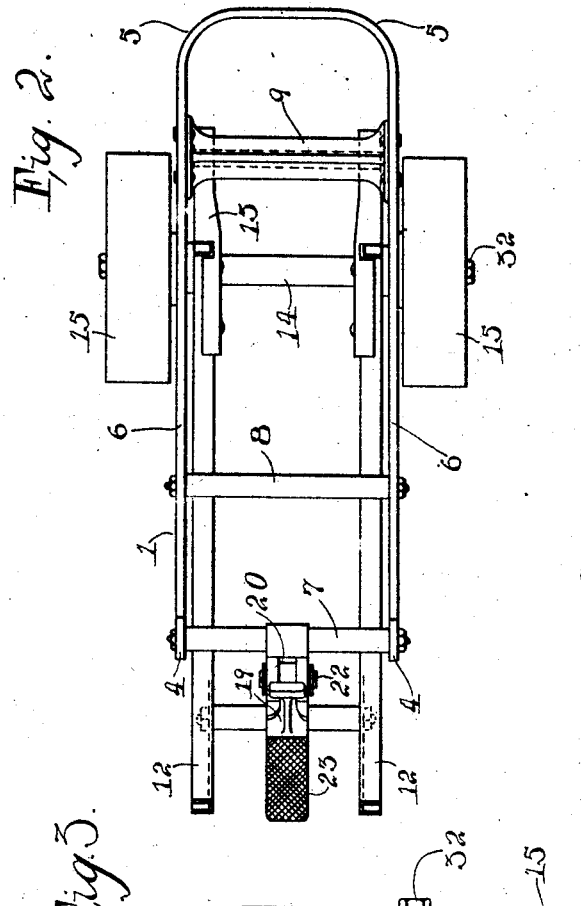
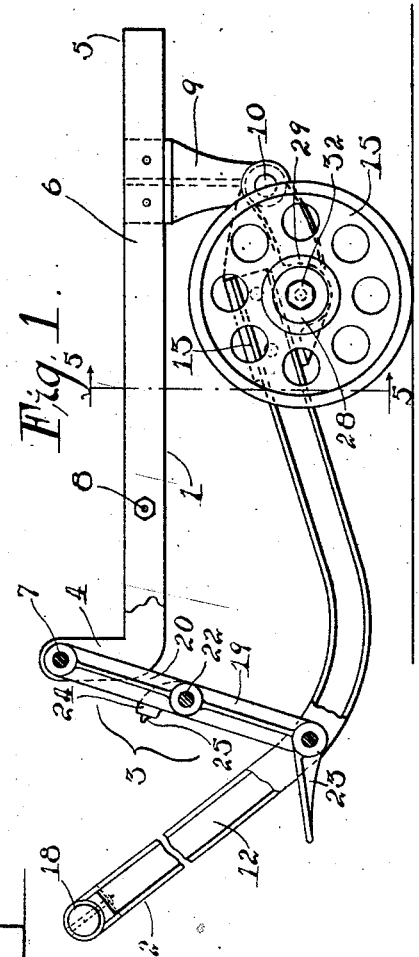
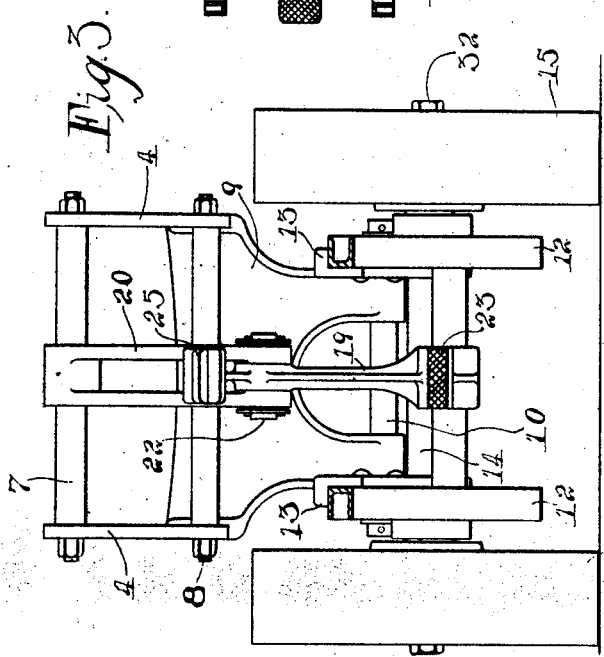
Inventor.
H. A. Huntoon.
By H. P. Deseurte
Atty.

April 24, 1928.
H. A. HUNTOON
LOAD LIFTING AND TRANSPORTING DEVICE
Filed June 21, 1926
1,667,382
2 Sheets-Sheet 2
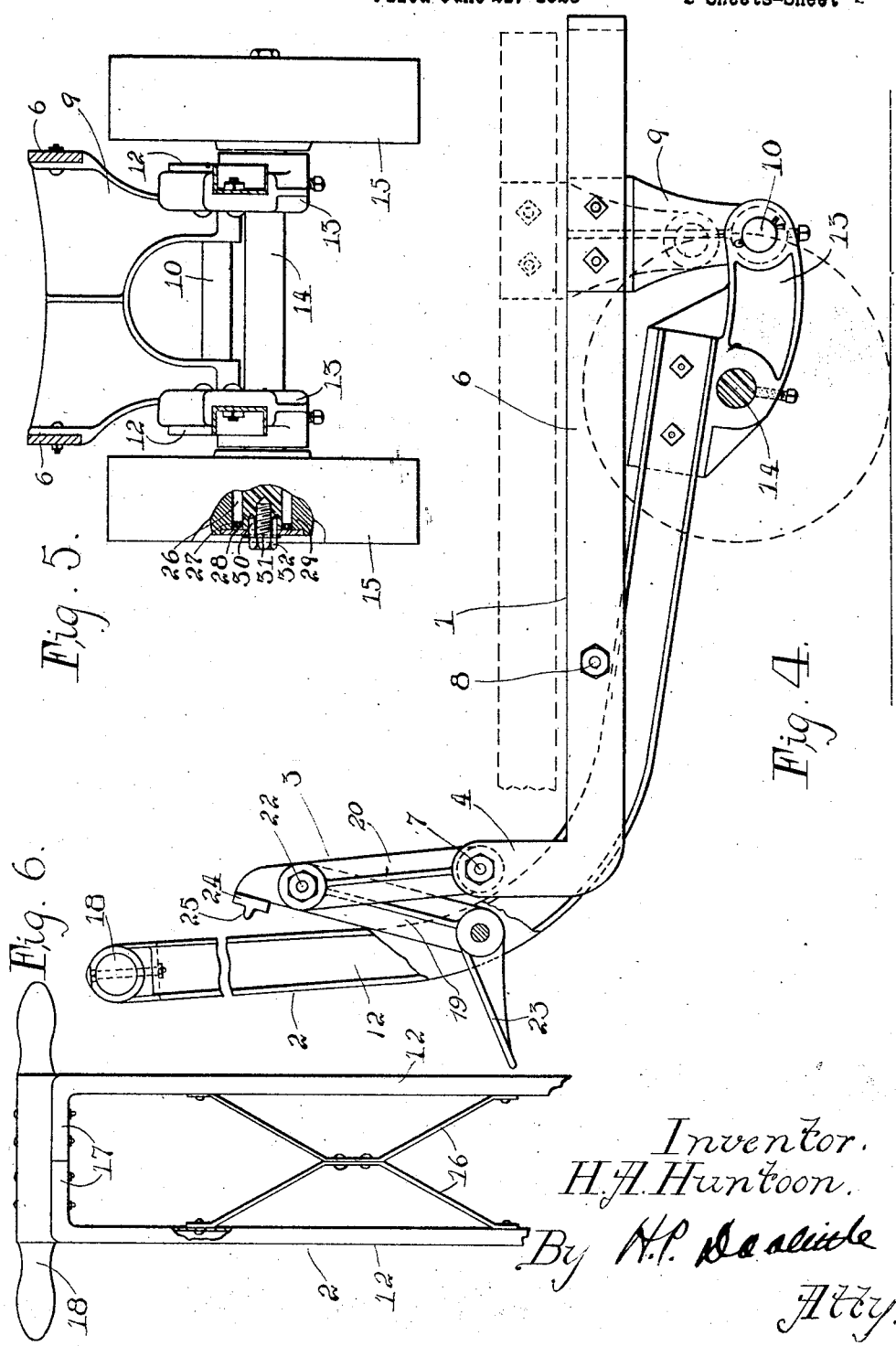

Patented Apr. 24, 1928.

1,667,382

UNITED STATES PATENT OFFICE.

HARRY A. HUNTOON, OF LA GRANGE, ILLINOIS, ASSIGNOR TO INTERNATIONAL HARVESTER COMPANY, A CORPORATION OF NEW JERSEY.

LOAD LIFTING AND TRANSPORTING DEVICE.

Application filed June 21, 1926. Serial No. 117,325.

This invention relates to load lifting and transporting devices, and more particularly to manually operated and wheel supported devices adapted to be used in factories and other buildings for transporting loads from one position to another.

The embodiment of the invention herein shown is a hand lift truck having a platform which is adapted to be moved underneath a skid or other similar support for boxes containing supplies of parts. Associated with the platform is a wheel supported handle for elevating the load from the floor so that it may be transported. Means for locking the platform in elevated position is also provided.

An object of the invention is to provide a practical load lifting and transporting device which will enable an operator to quickly lift loads into transportable position and to rapidly move them from one point to another.

Another object of the invention is to provide a hand lift truck which has a novel mode of operation and may be economically manufactured so as to add a minimum amount to the cost of production in a factory.

Other objects will appear as the description of the illustrative embodiment proceeds.

In the accompanying drawings there is illustrated a hand lift truck constructed in accordance with the teachings of this invention.

In the drawings:

Figure 1 is an elevation of the hand lift truck showing the platform locked in elevated position;

Figure 2 is a plan view of the illustrative truck;

Figure 3 is partly a sectional view, and partly an elevation of the truck;

Figure 4 is an elevation showing the platform of the truck in lowered or load receiving position, the members of the toggle lock being shown in the position to which they are moved when the handle of the truck is elevated;

Figure 5 is partly a sectional view and partly an elevation taken on the section line 5—5 of Figure 1, looking in the direction of the arrows; and Figure 6 is a detail view showing the structure of the lifting lever by which the illustrative truck is operated.

The hand lift truck shown in the drawings comprises a platform 1 supported upon a wheel carrying lever 2, the latter being movable from the position shown in Figure 4 to that shown in Figure 1, in order to elevate the load support or platform so that its load may be readily transported. The load support or platform is locked in elevated position by a toggle device indicated as a whole by the reference numeral 3.

Economy of manufacture is promoted by constructing the load support or platform 1 of a single bar. The bar shown is bent into U-shape formation, as illustrated particularly in Figure 2, and the ends of the bar are preferably bent upwardly in order to provide the load stops 4. The mid-portion of the bar forms the front end of the illustrative truck and is preferably bent along gradual curves in order to facilitate centering of the platform underneath the load. As is well shown in Figure 2 of the drawings the platform has the rounded corners 5 which act to guide the truck underneath its load. The forward end of the platform also acts as a bumper to protect other parts of the illustrative truck from injury.

The rails 6 of the platform 1 are connected at their rearward ends by a transverse spacer 7. Another spacer 8 braces the rails of the platform intermediate their ends. The forward portion of the illustrative platform is strengthened and braced by a transverse strut 9 herein shown as a pivot-block interposed between the rails of the platform and rigidly secured thereto. This pivot-block 9 forms a depending bracket supporting a transverse shaft or trunnion 10 which preferably projects beyond the sides of the pivot-block. This lever extends rearwardly from the trunnion 10 and is shown formed of two spaced channel irons 12 bolted at their forward ends to wheel blocks 13 journalled at their forward ends upon the trunnion 10. These wheel blocks are supported by an axle 14 preferably locked in position in the blocks by means of set screws. Supporting wheels 15 are rotatively mounted upon the ends of the axle. The lifting lever structure is preferably extended underneath and considerably beyond the end of the platform so as to enable the platform and its load to be easily lifted by pivotal movement of the lever downwardly from the position shown in Figure 4 to that shown in Figure 1.

The rearward and upwardly extending parallel bars of the lifting lever are braced and held rigidly in parallel relation by braces 16 herein shown as straps riveted to the channel bars and secured at their midportions so as to form substantially intersecting braces. The extreme ends of the channel bars are bent inwardly at right angles, as shown at 17. These right-angular portions are held in alignment by means of a suitably shaped handle 18 which is bolted within the channel of the bars, as shown.

After the platform has been moved underneath a load and has been elevated so as to move the load to transportable position, the platform has been lifted by the lever 2 to the position shown in Figure 1, and it is necessary to provide means for locking the platform in elevated position relative to the lever. As shown, this locking means consists of a toggle mechanism including a trip 19 and a lock bar 20, the latter being shown as U-shaped. The lock bar is pivoted upon the spacer 7 preferably connecting the upper ends of the load stops 4 of the platform. The trip is pivotally connected at its upper end (see Figure 1) to the lock bar by means of a pin 22, and is pivoted at its lower end upon a rod secured transversely between the channel bars of the lifting lever. The lower end of the trip is extended at an angle so as to form a pedal 23 placed within easy reach of the operator of the truck. The upper end of the trip 19 is extended beyond the pin 22 and is formed with a transverse lug 24 engaging one side of the lock bar 20 so as to maintain the parts in the positions in which they are shown in Figure 1.

In operation the illustrative truck is transported with the platform lowered, as shown in Figure 4. The platform is moved beneath a load and then the lever 2 is pressed downwardly. This action causes the forward end of the platform to engage the load, and further downward movement of the lever moves the toggle mechanism to partly extended condition, so that its parts approach the positions in which they are shown in Figure 1. As the load is further lifted, the operator presses with his foot upon the rib 25 of the trip 19, forcing the trip and the lock bar into their locking relationship, and thereby holding the platform and its load in elevated position. The load is then free to be transported by the truck to any desired position. When the operator desires to lower the load so that the truck may be withdrawn, he presses upon the pedal 23 and thus breaks the toggle lock so as to allow the rear end of the load to move downwardly. The weight of the load at this time acts also upon the forward end of the lever, causing the lever to pivot about the axle 14. The main portion of the lever, therefore, moves upwardly. This movement may be continued by a lift upon the handle 2 by the operator until the parts are brought into the position in which they are shown in Figure 4, whereupon the truck is free to be moved from underneath the load, which is preferably held in elevated position by supports on either side of the truck.

To facilitate the movement of the truck under heavy loads, the axle 14 is mounted within the wheels 15 by means of roller bearings 26 having spacers 27 particularly shown in the cut out portion of Figure 5. The wheels 15 are rotatively confined to the ends of the shaft by means of washers 28 preferably seated within shouldered portions of the wheel hubs 29. These washers may be provided with small openings through which locking pins 30 are passed. These locking pins also pass through holes formed in a lock washer 31 held in position by means of a cap screw 32 passing through both washers and screw-threaded into a bore within the axle.

The illustrative truck forms an article of factory equipment which is effective in its operation and is capable of rapid handling. It also may be economically manufactured, to the end that it forms a valuable adjunct to factory equipment without materially increasing costs of production.

While there has been shown and claimed one particular embodiment of the invention, it is to be understood that the invention is not limited thereto, but that changes in the structure, coming within the scope of the appended claims, are covered thereby.

Having described my invention, I claim:

1. In a hand lift truck, a vertically movable horizontal platform adapted to support a load, a lever, supports connecting the lever and the platform at separated points, both of said supports acting as compression members to support the platform with a load thereon when the platform is in load transporting position, and one of said supports acting as a lock constantly pivotally connecting said platform and said lever but releasable to allow the platform and its load to move downwardly.

2. A hand lift truck comprising, in combination, a horizontally positioned load supporting platform, a load lifting and transporting lever extending from a position above and rearwardly of said platform to a position underneath the platform near its forward end, means for pivotally connecting the forward end of the lifting lever and the platform, supporting wheels mounted upon an axle extending through and carried by the lever at a position rearwardly of said means, toggle mechanism constantly connecting the rearward end of the platform and the lever in such a manner as to be extended toward locking position when the lever is moved downwardly to elevate the platform and its load to load transporting position, and foot operated means carried by said mechanism for releasing the lock when it is desired to lower the platform and move the truck from underneath its load.

3. A hand lift truck comprising, in combination, a platform presenting a horizontal load receiving surface, a platform lifting lever extending underneath the platform from a position near the forward end of the platform and then upwardly to a position above and at the rear of the platform, means for pivotally connecting the forward end of the lever and the platform at a position underneath the forward end of the platform, supporting wheels carried by the lever rearwardly of said means, toggle locking and load supporting mechanism constantly connecting the rearward end of said platform and the lever and extensible toward locking position as the rearward end of the lever is moved downwardly to elevate the platform and its load, a stop carried by said toggle mechanism for preventing the parts of that mechanism from going past their dead center locking position, and a foot operated device for breaking the joint of said toggle mechanism and allowing the platform to be lowered.

4. A hand lift truck comprising, in combination, a platform presenting a horizontal load receiving surface, load stops rigid with the platform and extending upwardly therefrom at the rearward end of the latter, a platform lifting lever extending from a position underneath the forward end of the platform rearwardly underneath the load stops and then upwardly to a position at the rear and above the platform, means for pivotally connecting the forward end of the lever and the platform, rolling supports journaled near the forward end of the lever, a member pivotally connected to the stops near their upper ends, a link pivotally connecting the lever and said member, means for preventing the link and the member from movement past platform locking position when the lever is moved downwardly to elevate the platform, and foot operated means for moving the link and said member out of locking position to allow the platform to be lowered.

5. A hand lift truck comprising, in combination, a horizontally positioned load supporting platform, a load lifting and transporting lever extending from a position above and rearwardly of said platform to a position underneath the platform near its forward end, means for pivotally connecting the forward end of the lifting lever and the platform, supporting wheels mounted upon an axle carried by the lever at a position rearwardly of said means, toggle lock mechanism constantly connecting the rearward end of the platform and the lever in such a manner as to be extended toward platform locking position when the lever is moved downwardly to elevate the platform and its load, and foot operated means rigid with a part of the toggle mechanism for releasing the lock when it is desired to lower the platform and move the truck from underneath its load.

6. A hand lift truck comprising, in combination, a platform presenting a horizontal load receiving surface, a platform lifting and load transporting lever extending underneath the platform from a position near the forward end of the platform and then upwardly to a position above and at the rear of the platform, means for pivotally connecting the forward end of the lever and the platform at a position underneath the forward end of the platform, supporting wheels carried by the lever rearwardly of said means, toggle load supporting and platform locking mechanism constantly connecting the rearward end of said platform and the lever and extensible toward locking position as the rearward end of the lever is moved downwardly to elevate the platform and its load, a stop carried by said toggle mechanism for preventing the parts of that mechanism from going past their dead center locking position, and a foot operated device for breaking the joint of said toggle mechanism and allowing the platform to be lowered, said device being an extension of a part of the toggle mechanism.

7. A hand lift truck comprising, in combination, a platform presenting a horizontal load receiving surface, a load stop rigid with the platform and extending upwardly therefrom at the rearward end of the latter, a bent platform lifting lever extending from a position underneath the forward end of the platform rearwardly to a position underneath the load stop and then upwardly to a position at the rear and above the platform, means for pivotally connecting the forward end of the lever and the platform, a rolling support journaled near the forward end of the lever, a toggle member pivotally connected to the stop near its upper end, a toggle link pivotally connecting the lever and said member, a stop on the link for preventing the link and the member from movement past platform locking position when the lever is moved downwardly to elevate the platform, and foot operated means for moving the link and said member out of locking position to allow the platform to be lowered.

In testimony whereof I affix my signature.

HARRY A. HUNTOON